United States Patent
Richards et al.

(10) Patent No.: US 10,532,688 B2
(45) Date of Patent: Jan. 14, 2020

(54) VEHICLE ELEVATION SYSTEM

(71) Applicant: Federal Signal Corporation, Oak Brook, IL (US)

(72) Inventors: Jerry Wayne Richards, Hoover, AL (US); Jay Ghelani, Hoover, AL (US); John Benton Stafford, Foley, AL (US)

(73) Assignee: Federal Signal Corporation, Oak Brook, IL (US)

( * ) Notice: Subject to any disclaimer, the term of this patent is extended or adjusted under 35 U.S.C. 154(b) by 158 days.

(21) Appl. No.: 15/688,292

(22) Filed: Aug. 28, 2017

(65) Prior Publication Data

US 2019/0061591 A1 Feb. 28, 2019

(51) Int. Cl.

| B60P 1/16 | (2006.01) |
|---|---|
| B60P 1/28 | (2006.01) |
| B60P 1/04 | (2006.01) |
| B60G 11/34 | (2006.01) |
| B60G 5/053 | (2006.01) |

(52) U.S. Cl.
CPC ............. *B60P 1/162* (2013.01); *B60G 5/053* (2013.01); *B60G 11/34* (2013.01); *B60P 1/045* (2013.01); *B60P 1/283* (2013.01); *B60G 2200/318* (2013.01); *B60G 2202/112* (2013.01); *B60G 2800/91* (2013.01)

(58) Field of Classification Search
CPC ................................ B60P 1/162; B60P 1/045; B60P 1/283; B66F 11/00; B60G 17/005; B60G 5/053; B60G 11/34; B60G 2500/324; B60G 2300/0262; B60G 2204/4605; B60G 2202/413; B60G 2200/318; B60G 2800/91; B60G 2202/112

USPC .......... 298/11, 17 R, 22 R, 22 P, 22 D, 19 B, 298/17 B, 17 S; 280/124.157, 124.158, 280/124.159, 124.16, 6.153, 6.159, 280/124.17

See application file for complete search history.

(56) References Cited

U.S. PATENT DOCUMENTS

| 2,570,334 | A | 10/1951 | Erjavec | |
|---|---|---|---|---|
| 3,336,080 | A * | 8/1967 | Heck | B60P 1/18 298/17 R |
| 3,433,457 | A | 3/1969 | Van Der Ende | |
| 3,619,007 | A | 11/1971 | Phillips | |
| 4,951,999 | A | 8/1990 | Rudolph et al. | |
| 6,817,677 | B1 | 11/2004 | Beiler | |
| 7,950,678 | B1 * | 5/2011 | Bauder | B60G 5/047 280/124.17 |
| 2012/0001473 | A1 * | 1/2012 | Foisie | B60P 1/045 298/17 S |

FOREIGN PATENT DOCUMENTS

GB 2141399 A 12/1984

* cited by examiner

*Primary Examiner* — Stephen T Gordon
(74) *Attorney, Agent, or Firm* — Merchant & Gould P.C.

(57) ABSTRACT

A dumping vehicle includes a vehicle elevation system for elevating a body of a vehicle. The system can use one or more components of a vehicle as a main support against which a vehicle body is elevated. In certain examples, a suspension device of the vehicle can be used as the main support. The system further includes an elevation device arranged between the suspension device and a vehicle frame and configured to elevate the vehicle body by lifting the vehicle frame against the suspension device.

22 Claims, 11 Drawing Sheets

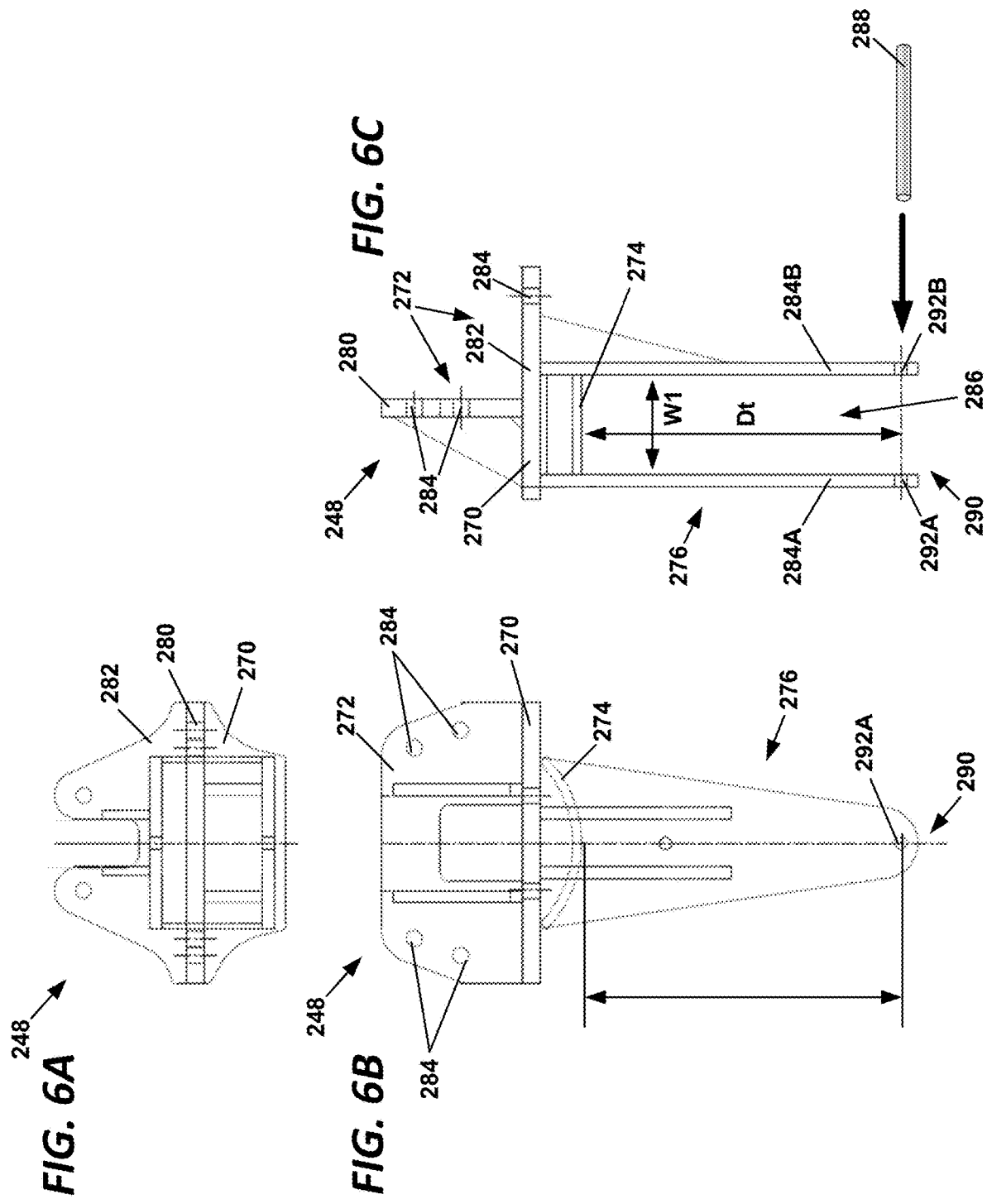

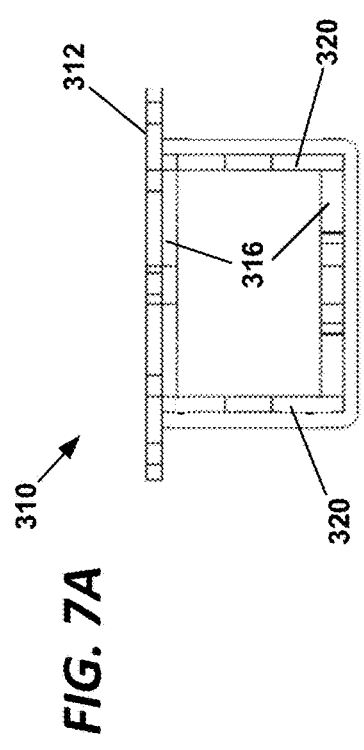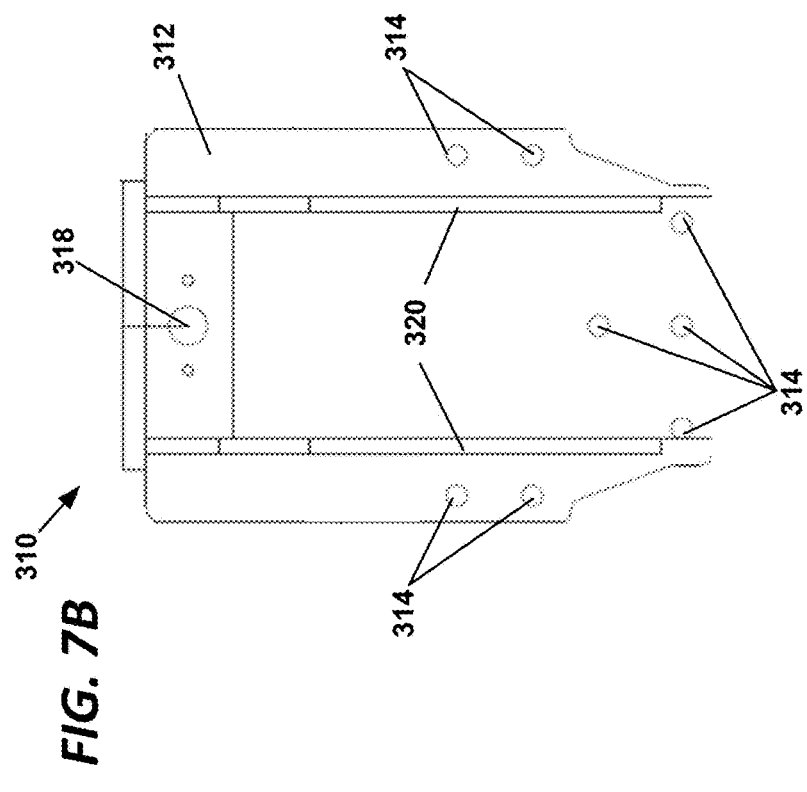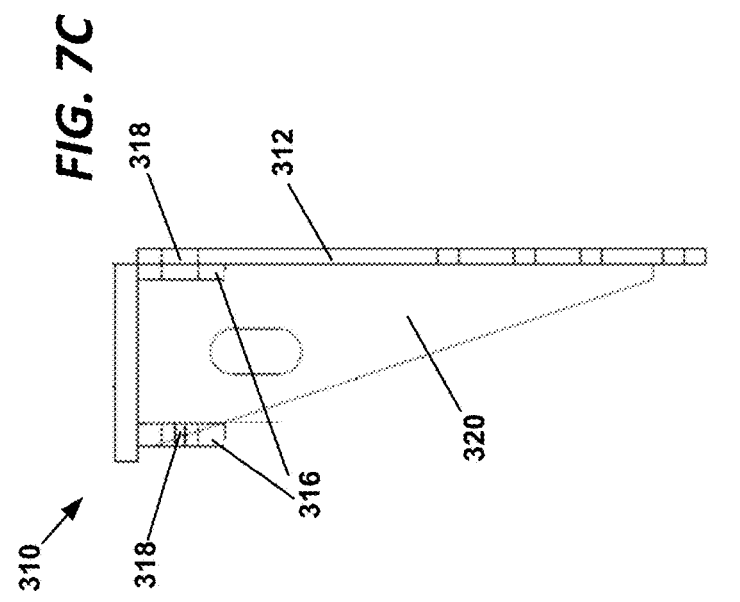

VEHICLE ELEVATION SYSTEM

BACKGROUND

Dumping vehicles, such as dump trucks, sewer cleaning vehicles, and vacuum excavating vehicles, include a tank or body configured to contain a material. For example, a sewer cleaning vehicle includes a debris tank mounted to a vehicle bed and configured to collect debris or sludge removed from a sewer pipe being cleaned. The material loaded into the body needs to be dumped into a separate container for disposal. Such disposal containers, although available in various heights, are typically too high for typical dumping vehicles to dump the material from their bodies into. Therefore, a body of dumping vehicles needs to be elevated for dumping the material from the body into a disposal container.

Various structures have been used to raise a dumping vehicle to a height sufficient for dumping into a disposal container. Some dumping vehicles utilize hydraulic jacks to lift a tank off of a vehicle frame at an end from which the material from the tank is dumped. Other dumping vehicles use outriggers to stabilize the load while tanks are raised or tilted. Yet other dumping vehicles are designed to use outriggers for stabilization and raise the entire rear portion of the vehicles so that the rear tires are lifted away from the ground. In yet other situations, dumping vehicles require a ramp arranged adjacent a disposal container to raise the rear of the vehicles away from the ground. As such, these elevation mechanisms require additional components that make the structures and operations of dumping vehicles complicating.

SUMMARY

In general terms, the present disclosure relates to a vehicle elevation system. In one possible configuration and by non-limiting example, the vehicle elevation system includes an elevation device extending between a suspension system of the vehicle and another part of the vehicle and configured to elevate that part of the vehicle against the suspension system. Various aspects are described in this disclosure, which include, but are not limited to, the following aspects.

One aspect is a vehicle including a suspension system, an elevation device, and an elevation control device. The elevation device is arranged between the suspension system and a part of the vehicle. The elevation control device is configured to operate the elevation device between a retracted position and an extended position. The elevation device may extend between the suspension system and the part of the vehicle and elevates the vehicle against the suspension system.

In certain examples, the part of the vehicle includes a vehicle frame. The elevation device may extend between the suspension system and the vehicle frame. In certain examples, the suspension system includes an axle assembly including wheels and an axle. In certain examples, the elevation device extends between the axle and the vehicle frame. In certain examples, in the extended position, tires of the wheels remain in contact with the ground and rotatable so that the vehicle is drivable.

In certain examples, the elevation device includes a hydraulic cylinder assembly having a hydraulic chamber, and the elevation control device includes a hydraulic circuit. The hydraulic circuit may be in fluid communication with the hydraulic chamber. In certain examples, the hydraulic circuit includes a hydraulic power supply, a hydraulic accumulator, and a control valve. The hydraulic power supply is configured to supply fluid to the hydraulic chamber. The hydraulic accumulator is selectively in fluid communication with the hydraulic chamber. The control valve is configured to selectively connect the hydraulic accumulator to the hydraulic chamber. The control valve is configured to disconnect the hydraulic accumulator from the hydraulic chamber as the elevation device operates from the retracted position to the extended position.

In certain examples, the suspension system includes a spring assembly connected between the axle assembly and the vehicle frame. The spring assembly may be configured to move relative to the vehicle frame as the elevation device moves between the retracted position and the extended position.

In certain examples, the hydraulic cylinder assembly further includes an air chamber opposite to the hydraulic chamber, and the elevation control device includes an air supply circuit being in fluid communication with the air chamber.

Another aspect is a dumping vehicle including a vehicle frame, a debris body, a front suspension system, a rear suspension system including a first rear axle assembly, an elevation device arranged between the suspension system and the vehicle frame, and an elevation control device configured to operate the elevation device between a retracted position and an extended position. The elevation device may extend between the rear suspension system and the vehicle frame and elevates the vehicle frame against the rear suspension system.

In certain examples, when the elevation device is in the extended position, the front suspension system and the rear suspension system may remain in contact with the ground so that the dumping vehicle is drivable.

In certain examples, the rear suspension system may further include a second rear axle assembly and a spring assembly. The spring assembly may include a leaf spring, a first spring bracket, and a second spring bracket. The elevation device may be engaged between the second rear axle assembly and the vehicle frame.

In certain examples, the first spring bracket may be configured to engage a first end of the leaf spring and mounted to the vehicle frame adjacent the first rear axle assembly. The second spring bracket may be configured to engage a second end of the leaf spring and mounted to the vehicle frame adjacent the second rear axle assembly.

In certain examples, the second spring bracket includes a spring end rest portion configured to provide a surface against which the second end of the leaf spring rests when the elevation device is in the retracted position. In certain examples, the second spring bracket may further include a spring guide portion configured to movably engage the second end of the leaf spring as the elevation device moves between the retracted position and the extended position.

In certain examples, the elevation device includes a hydraulic cylinder assembly having a hydraulic chamber, and the elevation control device includes a hydraulic circuit, the hydraulic circuit being in fluid communication with the hydraulic chamber.

In certain examples, the hydraulic circuit may include a hydraulic power supply, a hydraulic accumulator, and a control valve. The hydraulic power supply may be configured to supply fluid to the hydraulic chamber. The hydraulic accumulator may be selectively in fluid communication with the hydraulic chamber. The control valve may be configured to selectively connect the hydraulic accumulator to the hydraulic chamber. The control valve is configured to disconnect the hydraulic accumulator from the hydraulic chamber as the elevation device operates from the retracted position to the extended position.

In certain examples, the hydraulic circuit may further include a safety valve arranged between the hydraulic power supply and the hydraulic chamber of the hydraulic cylinder and configured to ensure that the hydraulic cylinder assembly remains operable by the hydraulic power supply.

In certain examples, the hydraulic cylinder assembly may further include an air chamber opposite to the hydraulic chamber, and the elevation control device includes an air supply circuit being in fluid communication with the air chamber.

BRIEF DESCRIPTION OF THE DRAWINGS

FIG. 6A is a schematic top view of an example bracket for a spring assembly of a suspension system.

FIG. 6B is a schematic front view of the bracket of FIG. 6A.

FIG. 6C is a schematic side view of the bracket of FIG. 6A.

FIG. 7A is a schematic top view of an example cylinder bracket for a hydraulic cylinder assembly.

FIG. 7B is a schematic front view of the cylinder bracket of FIG. 7A.

FIG. 7C is a schematic side view of the bracket of FIG. 7A.

DETAILED DESCRIPTION

Figure 1:
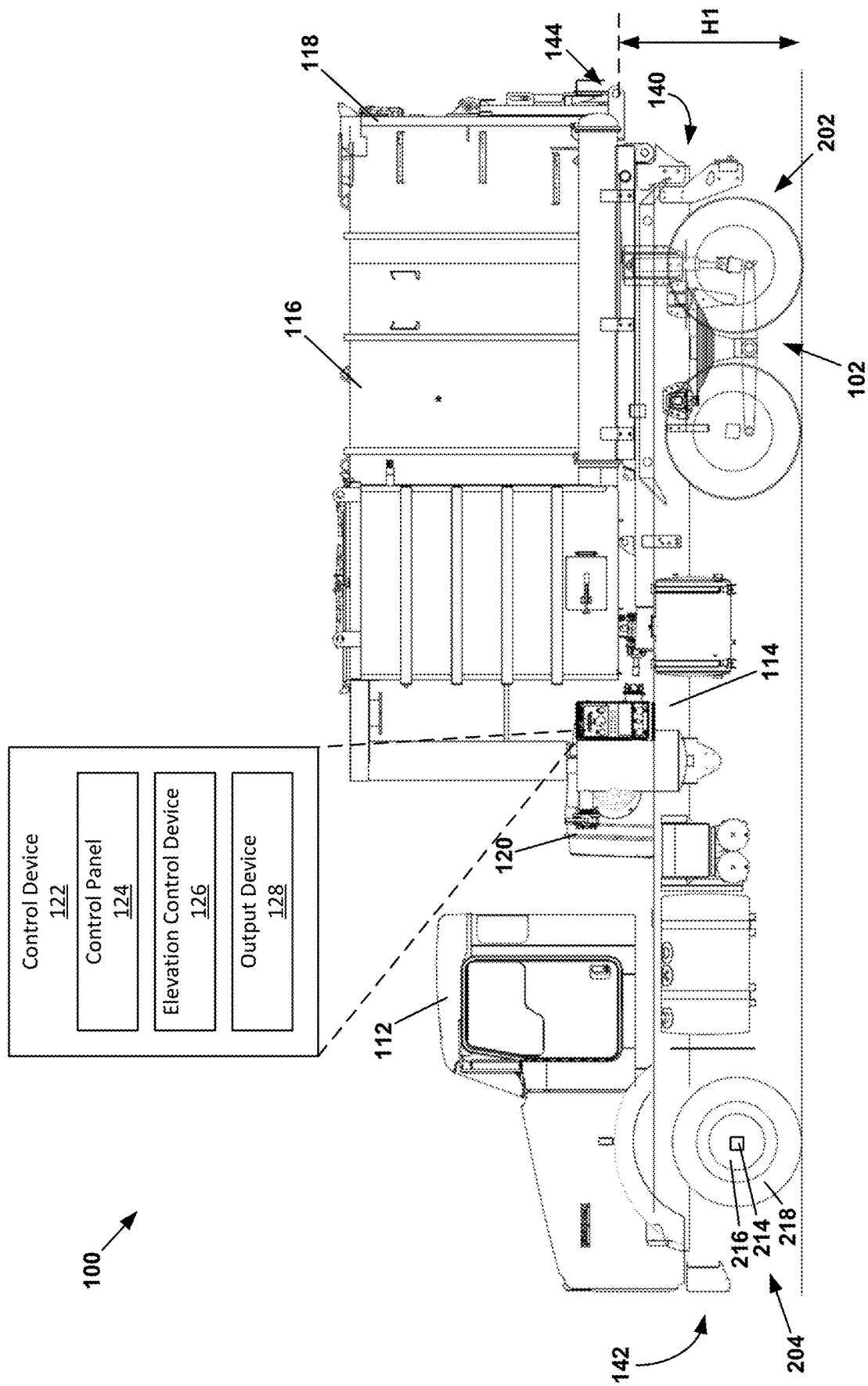
FIG. 1 schematically illustrates an exemplary embodiment of a dumping vehicle in accordance with the present disclosure.

Various embodiments will be described in detail with reference to the drawings, wherein like reference numerals represent like parts and assemblies throughout the several views.

In general, a vehicle elevation system of the present disclosure provides a simple, cost efficient structure for elevating a body of a vehicle. The system can utilize one or more components of a vehicle as a main support against which a vehicle body is elevated. Dumping vehicles with the vehicle elevation system do not require additional structures or components to properly dump the materials from the body of the vehicle into a disposal container.

Such vehicle components as a main support include a suspension device of the vehicle. The system further includes an elevation device extending between the suspension device and a vehicle frame and configured to elevate the vehicle body by lifting the vehicle frame against the suspension device. One example of the vehicle body that can be lifted is a debris tank of a cleaning vehicle that is configured to collect debris and be lifted for dumping the debris. While the vehicle frame is elevated, at least one component (e.g., a leaf spring assembly) of the suspension device is configured to become operatively disengaged from the vehicle. As such, the system of the present disclosure can improve stability during elevation or dumping as the vehicle suspension at least partially becomes inoperative. Further, the system of the present disclosure includes a control system for enhancing stability by disengaging at least one component (e.g., a hydraulic accumulator) of the vehicle from the rest of the vehicle.

FIGS. 1 and 2 schematically illustrate an exemplary embodiment of a dumping vehicle in accordance with the present disclosure. The dumping vehicle is generally designated by reference number 100. The dumping vehicle 100 includes a vehicle elevation system 102 configured to elevate a part of the dumping vehicle 100 as described herein.

The dumping vehicle 100 can be of various types. Examples of the dumping vehicle 100 include a dump truck, a sewer cleaning vehicle, a catch basin cleaning vehicle, a vacuum excavating vehicle, and other vehicles having a tank or body for containing a material. In this document, the dumping vehicle 100 is primarily described as a vacuum truck. However, other types of dumping vehicles are also possible to implement the vehicle elevation system 102 in accordance with the present disclosure as described herein.

In this embodiment, the dumping vehicle 100 includes a cab 112 and a frame 114 extending rearwards from the cab 112. A debris body 116 is mounted to the frame 114. The debris body 116 is used to collect a material, such as debris, sludge, solids, liquids, slurries, and other materials removed from an area being cleaned. In some examples, the debris body 116 is pivotally mounted to the frame 114 adjacent the rear of the frame 114 and the front of the debris body 116 lifts off the frame 114 and is tilted for dumping the material collected in the debris body 116 (see arrow A in FIG. 2A). The rear end of the debris body 116 includes a pivotally mounted door 118 coupled to the remainder of the debris body 116.

In some embodiments, the dumping vehicle includes a vacuum hose (not shown) that is fluidly connected to the debris body 116 at one end and is configured to extend down to an area being cleaned. A vacuum pump 120 is provided at the vehicle 100 and configured to create a negative pressure inside of the debris body 116. The area being cleaned is sucked up with materials, such as debris, through the vacuum hose and deposited into the debris body 116.

The dumping vehicle further includes a control device 122 that operates to control various parts and devices of the vehicle 100. In some embodiments, the control device 122 includes a control panel 124, an elevation control device 126, and an output device 128.

The control panel 124 provides control elements for operating and controlling various parts, components, and devices of the vehicle 100. The control panel 124 can include physical control elements, such as buttons, switches, levers, selectors, and joysticks. In other examples, the control panel 124 includes electronic control elements. For example, the control panel 124 can be integrated with a display device, such as a touch sensitive display screen, and include graphical user interface control elements or widgets.

The elevation control device 126 operates to control the vehicle elevation system 102. In some embodiments, where the vehicle elevation system 102 includes hydraulic devices, the elevation control device 126 includes a hydraulic circuit configured to control such hydraulic devices in the vehicle elevation system 102. An example of the elevation control device 126 is described in more detail with reference to FIGS. 8 and 9.

The output device 128 operates to present various information, such as operational information of the vehicle 100, to an operator of the vehicle. Examples of the output device 128 can include one or more display devices, indicator lights, and alarms. The output device 128 can be arranged in various locations of the vehicle 100. For example, the output device 128 can be arranged and exposed at the exterior of the vehicle such that an operator can access the output device 128 outside the vehicle 100. In other example, the output device 128 is disposed in the cab 112 so that an operator can access the output device 128 while driving or controlling the vehicle in the cab 112.

Figure 2A:
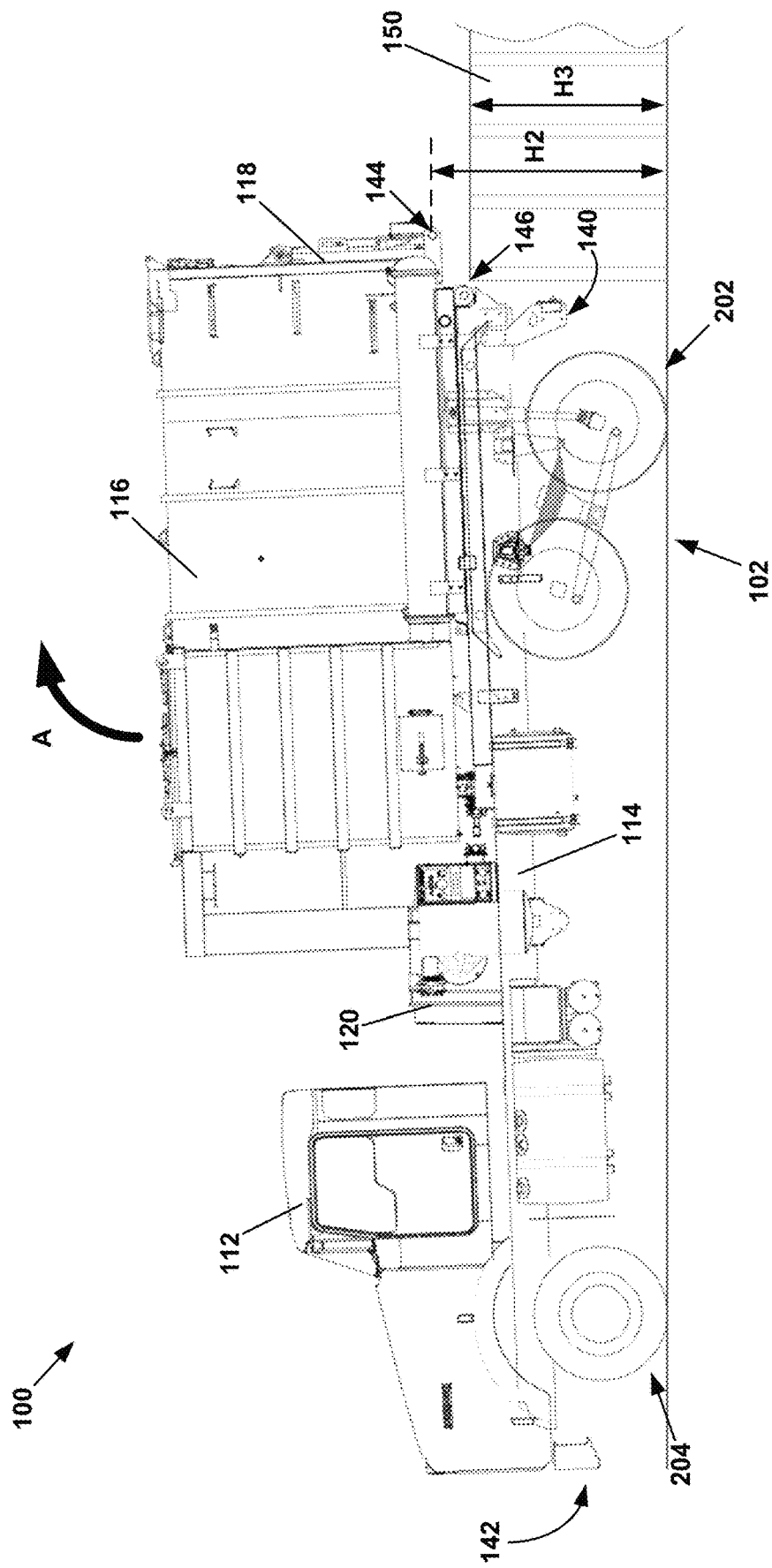
FIG. 2A schematically illustrates the dumping vehicle of FIG. 1 in an elevated position.

Referring still to FIGS. 1 and 2, the vehicle elevation system 102 operates to elevate at least a part of the vehicle 100. In this embodiment, the vehicle elevation system 102 is configured and arranged to lift a rear end 140 of the vehicle frame 114. For example, the vehicle elevation system 102 can operate to arrange the vehicle 100 in a normal position where the vehicle 100 is horizontally positioned and normally drivable, as shown in FIG. 1, or arrange the vehicle 100 in an elevated position where the tail of the vehicle 100 (such as the rear end 140 of the vehicle frame 114) is raised from the normal position, as shown in FIG. 2A.

In the normal position, the debris body 116 is positioned at a first height H1, which, for example, can be measured as a distance between the ground and a bottom portion 144 of the debris body 116. In the elevated position, the debris body 116 is raised to a second height H2 greater than the first height H1 so that the bottom portion 144 of the debris body 116 is arranged above a height H3 of a disposal container 150. In some embodiments, when the vehicle 100 is in the elevated position, the debris body 116 is tilted toward the top of the disposal container 150. For example, as indicated by arrow A in FIG. 2A, the debris body 116 is pivoted around a bottom rear end 146 so that the door 118 generally faces the top of the container 150. Known mechanisms, such as a hydraulic or pneumatic actuator, can be used to move the debris body 116 in the tilted position.

Figure 2B:
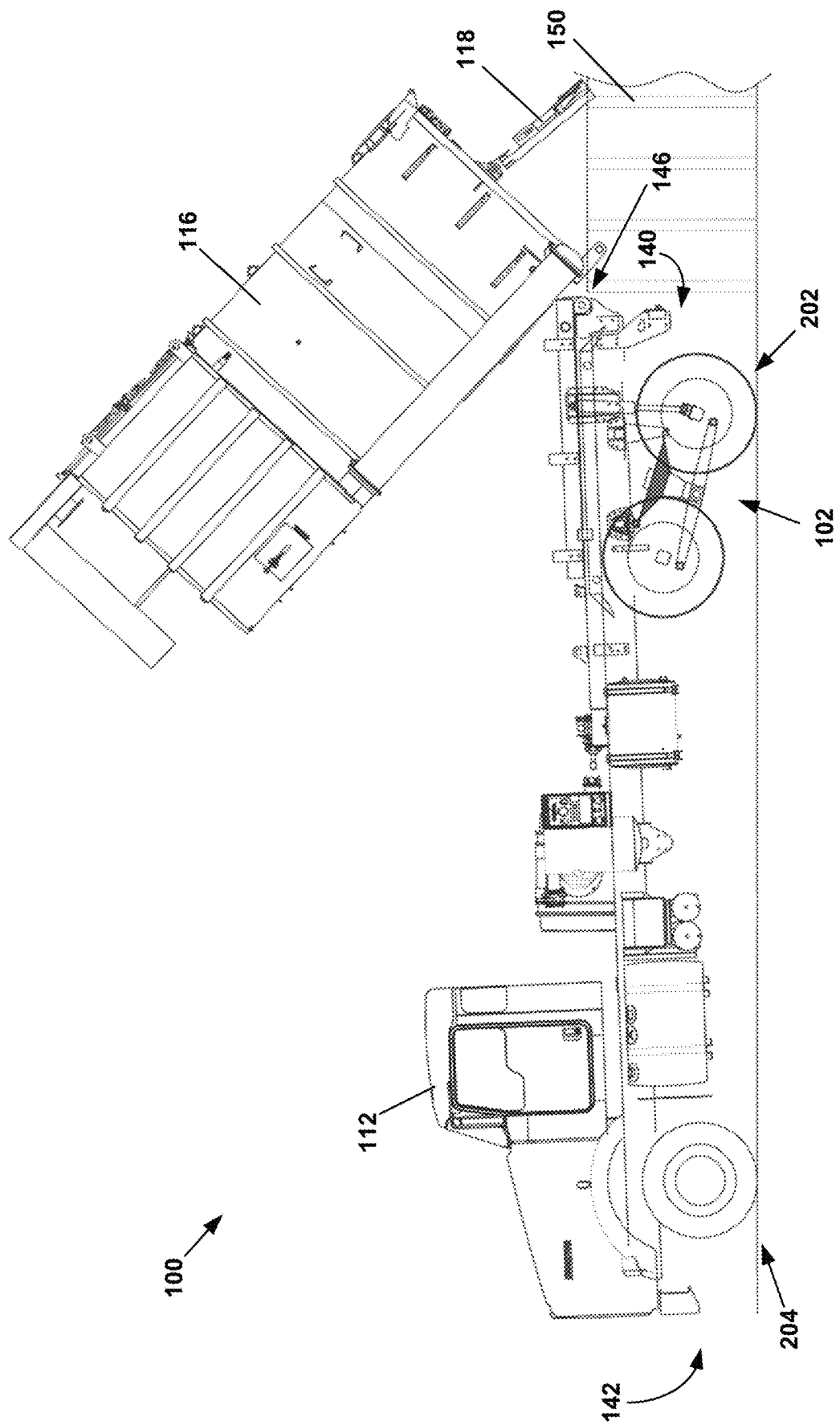
FIG. 2B schematically illustrates the dumping vehicle of FIG. 2A having a debris body tilted toward a disposal container.

When the debris body 116 is tilted in the elevation position, the door 118 can be opened to dump the material loaded in the debris body 116 into the container 150. FIG. 2B illustrates that the debris body 116 is tilted toward the disposal container 150 and the door 118 is open while the vehicle 100 is in the elevated position. The container 150 can be of various configurations, such as roll-off type containers.

In some embodiments, the vehicle 100 is first driven by an operator close to a disposal container 150. For example, the operator can drive the vehicle 100 backwards so that the tail of the vehicle is positioned adjacent the container 150. The vehicle elevation system 102 allows the operator to elevate the rear end 140 of the vehicle frame 114 while the operator drives the vehicle back toward the container 150. As described herein, the system operates to elevate the vehicle frame 114 while the front axle assembly and at least one rear axle assembly remain on the ground, and thus makes the vehicle drivable while the vehicle frame is being elevated. Once the vehicle has been positioned in place (e.g., in parking or idling) with respect to the container and the debris body is sufficiently elevated away from the ground, the operator can operate the vehicle (such as using a control panel of the vehicle) to tilt the debris body 116 toward the top of the disposal container 150 and then open the door 118 of the debris body 116 to dump the material from the debris body 116 to the disposal container 150. In some examples, the control panel for tilting the debris body is located outside the cab. In this case, the operator needs to get out of the cab once the vehicle is in position, and manipulate the control panel to tilt the debris body 116 toward the top of the container 150.

Figure 3:
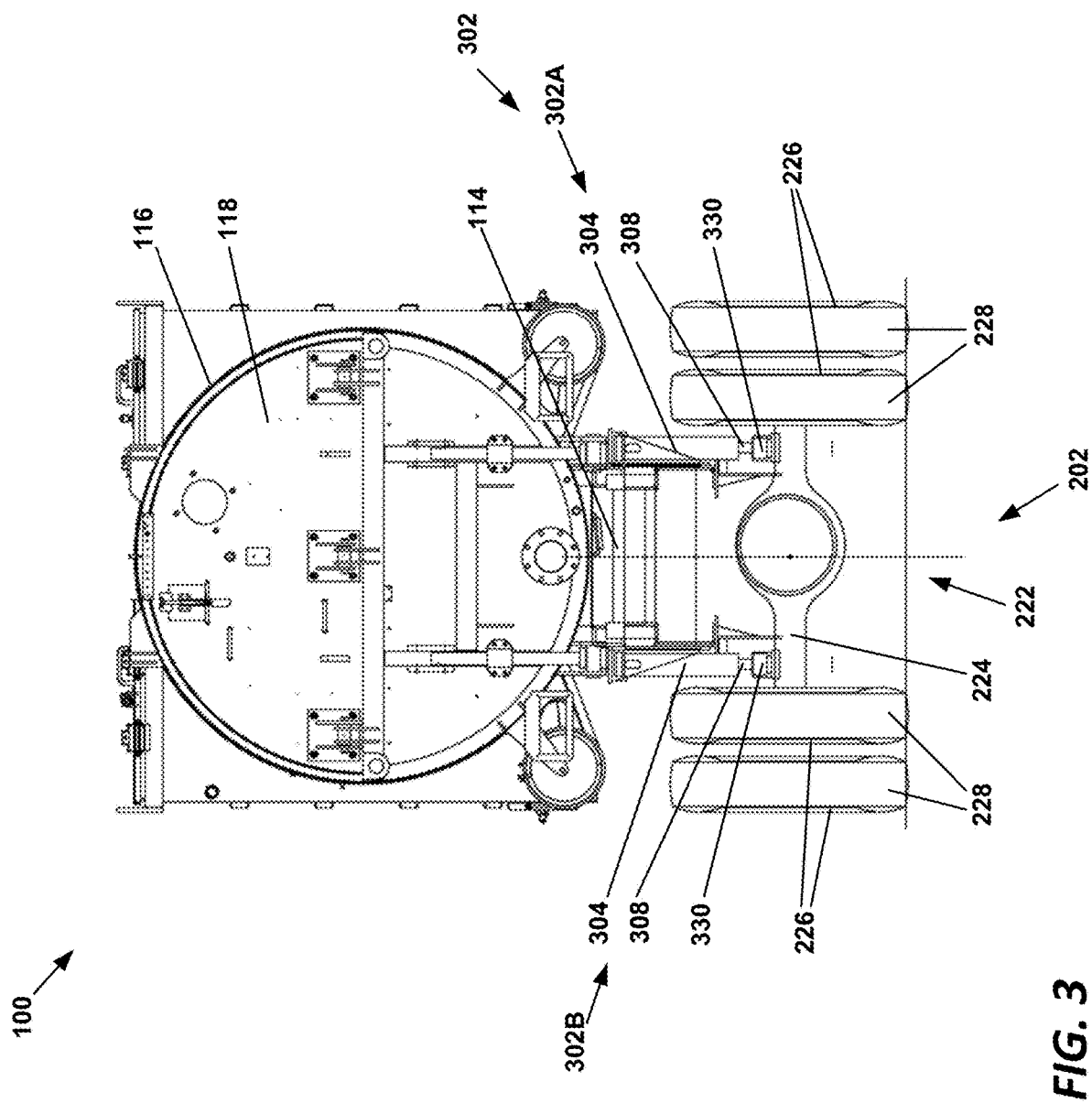
FIG. 3 is a schematic rear view of the vehicle of FIG. 1.
Figure 4:
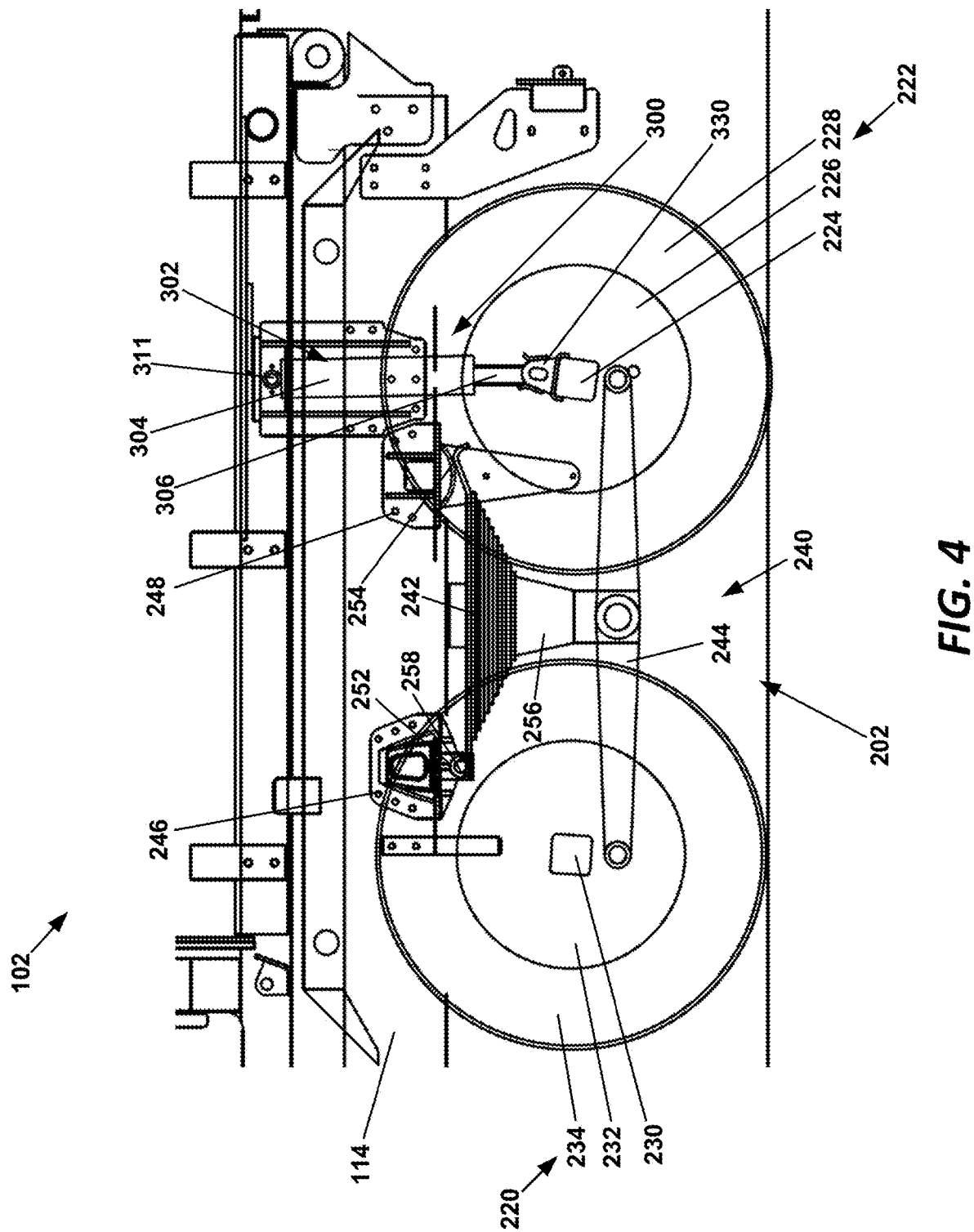
FIG. 4 is a schematic expanded view of a vehicle elevation system when the vehicle is in the normal position.
Figure 5:
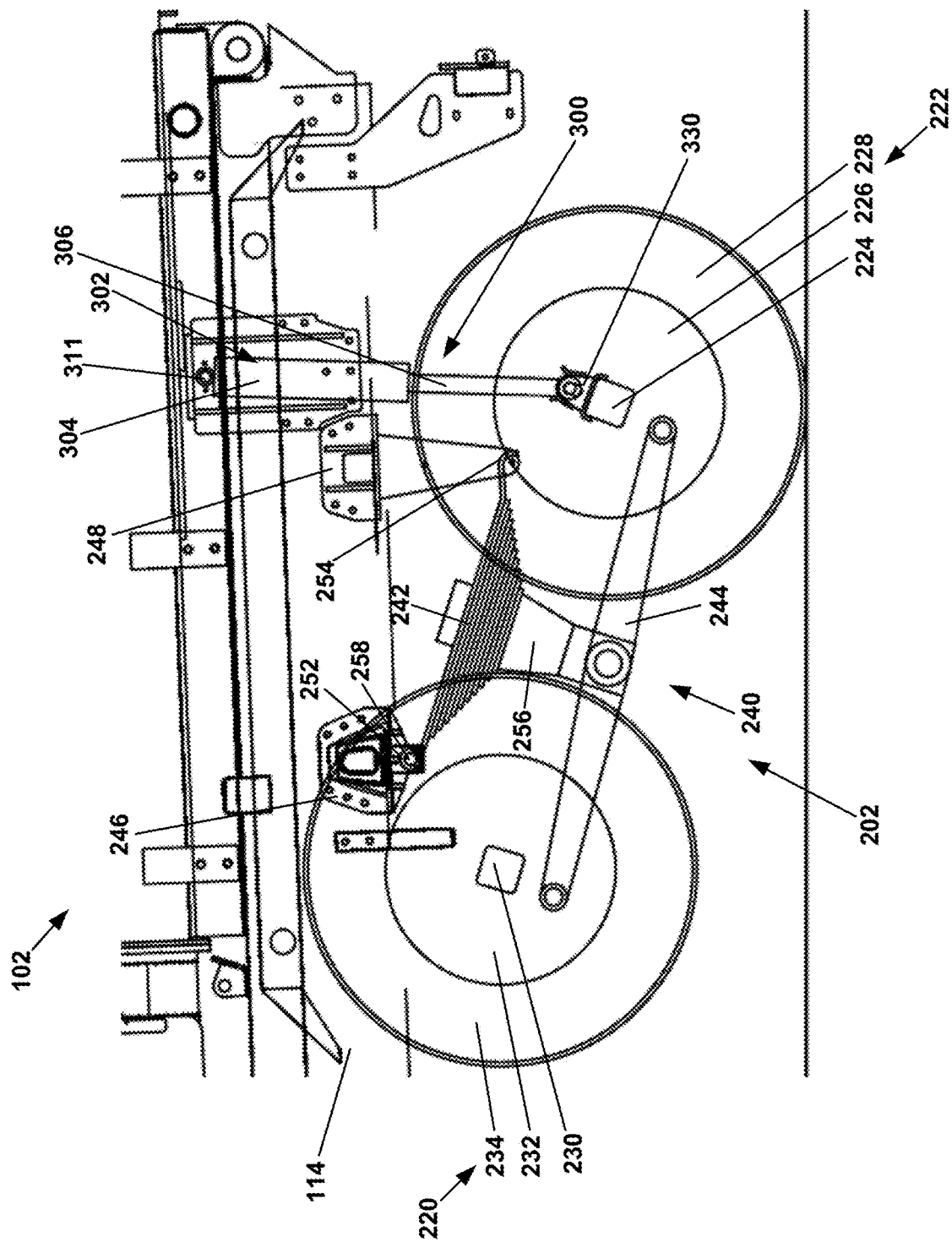
FIG. 5 is a schematic expanded view of the vehicle elevation system when the vehicle is in the elevated position.

Referring now to FIGS. 3-5, the vehicle elevation system 102 is further described. In particular, FIG. 3 is a schematic rear view of the vehicle 100 of FIG. 1, FIG. 4 is a schematic expanded view of the vehicle elevation system 102 when the vehicle 100 is in the normal position, and FIG. 5 is a schematic expanded view of the vehicle elevation system 102 when the vehicle 100 is in the elevated position.

The vehicle elevation system 102 can engage and utilize parts and elements of the vehicle 100 to operate the vehicle 100 in either the normal position (FIG. 4) or the elevated position (FIG. 5). The vehicle elevation system 102 is integrated with the vehicle 100 and does not require other devices, such as outriggers, which would typically be used to raise the vehicle or the debris body away from the ground.

In some embodiments, the vehicle elevation system 102 is provided to a suspension system 200 of the vehicle 100. In this example, it is primarily described that the vehicle elevation system 102 is implemented with a rear suspension system 202 of the vehicle 100. However, it is understood that the vehicle elevation system 102 is similarly applicable to a front suspension system 204 of the vehicle 100.

As illustrated, in some embodiments, the suspension system 200 of the vehicle 100 includes the front suspension system 204 and the rear suspension system 202. The front suspension system 204 includes a front axle assembly 212 which can include a front axle 214, a pair of front wheels 216, and a pair of front tires 218.

The rear suspension system 202 includes a first rear axle assembly 220 and a second rear axle assembly 222. In the illustrated example, the first rear axle assembly 220 is arranged closer to the front of the vehicle 100 than the second rear axle assembly 222, and the second rear axle assembly 222 is arranged closer to the tail of the vehicle 100 than the first rear axle assembly 220. The first rear axle assembly 220 includes a first rear axle 230, a set of first rear wheels 232, and a set of first rear tires 234. As known, the first rear axle 230 extends between the opposite first rear wheels 232 (and the tires 234) along a width of the vehicle 100. Similarly, the second rear axle assembly 222 includes a second rear axle 224, a set of second rear wheels 226, and a set of second rear tires 228. The second rear axle 224 extends between the opposite second rear wheels 226 (and the tires 228) along the width of the vehicle 100, as illustrated in FIG. 3. In this example, each side of the vehicle has a pair of first rear wheels 232 (and their tires 234) and a pair of second rear wheels 226 (and their tires 228). Other numbers of first and second rear wheels 232 and 226 are also possible.

In some embodiments, the rear suspension system 202 can further include a spring assembly 240 configured to provide locating, damping, and/or springing functions to the vehicle 100. In some embodiments, the spring assembly 240 includes a leaf spring 242, an axle connection bar 244, a first spring bracket 246, and a second spring bracket 248.

In some embodiments, the spring assembly 240 is used as part of a suspension system when the vehicle is driven. The spring assembly 240 is configured to be operatively disengaged from other components of the rear suspension system 202 when the vehicle is in the elevated position. As described below, for example, the leaf spring 242 is not fully engaged to perform its normal operation when the vehicle 100 departs from the normal position and moves to the elevated position.

The leaf spring 242 can be in the form of a slender arc-shaped length of spring steel of rectangular cross-section. In the illustrated example, the leaf spring 242 has a first end 252, a second end 254, and a middle portion 256. The middle portion 256 is connected to the axle connection bar 244 that extends between the first rear axle assembly 220 and the second rear axle assembly 222. In some embodiments, the middle portion 256 of the leaf spring 242 is pivotally connected to the axle connection bar 244. In other embodiments, the middle portion 256 of the leaf spring 242 is fixed to, or integrally formed with, the axle connection bar 244.

The first spring bracket 246 is configured to engage the first end 252 of the leaf spring 242 and mounted to a part of the vehicle 100. In some embodiments, the first spring bracket 246 is attached to the vehicle frame 114 adjacent the first rear axle assembly 220. The first spring bracket 246 can pivotally connect the first end 252 of the leaf spring 242 so that the leaf spring 242 rotates around a spring pivot point 258 as the vehicle 100 moves between the normal position (FIG. 4) and the elevated position (FIG. 5).

The second spring bracket 248 is configured to engage the second end 254 of the leaf spring 242 and mounted to a part of the vehicle 100. In some embodiments, the second spring bracket 248 is attached to the vehicle frame 114 adjacent the second rear axle assembly 222. The second spring bracket 248 can movably support the second end 254 of the leaf spring 242 so that the leaf spring 242 is movable while supported by the second spring bracket 248 as the vehicle 100 moves between the normal position (FIG. 4) and the elevated position (FIG. 5).

With further reference to FIGS. 6A-6C, the second spring bracket 248 can include a bracket base 270, a mounting portion 272, a spring end rest portion 274, and a spring guide portion 276. The mounting portion 272 is configured to mount the second spring bracket 248 to a desired location, such as the vehicle frame 114, of the vehicle 100. In this example, the mounting portion 272 includes one or more walls, such as a wall 280 extending perpendicularly from the base 270 and a wall 282 extending in parallel from the base 270. The walls 280 and 282 can be abutted to the surface of the frame 114 of the vehicle 100 and fixed to the frame 114 in various methods. In this example, the walls 280 and 282 can be fastened to the frame 114 through fastening holes 284 therein.

The spring end rest portion 274 is arranged under the base 270 and provides a surface on which the second end 254 of the leaf spring 242 rests when the vehicle 100 is in the normal position, as illustrated in FIG. 4. In some embodiments, the spring end rest portion 274 includes a curved portion that projects convexly from the bottom of the base 270. The spring end rest portion 274 can be arranged within the spring guide portion 276, such as between two opposite guide walls 284A and 284B of the spring guide portion 276.

As illustrated in FIG. 4, when the second end 254 of the leaf spring 242 seats on the spring end rest portion 274 when the vehicle is in the normal position, the spring assembly 240 is in an operative position so as to perform its intended functions, such as locating, damping, and/or springing functions for the vehicle 100. As illustrated in FIG. 5, as the vehicle is elevated, the second end 254 of the leaf spring 242 becomes apart from the spring end rest portion 274 and the spring assembly 240 thus cannot perform its intended functions. Therefore, the spring assembly 240 becomes operatively disengaged from other components of the rear suspension system 202.

The spring guide portion 276 is configured to movably engage the second end 254 of the leaf spring 242. In some embodiments, the spring guide portion 276 includes two opposite guide walls 284A and 284B which extend downwards from the base 270 and define a spring guide space 286 therebetween. The guide walls 284A and 284B can extend in parallel to define a constant width W1 of the spring guide space 286 between the guide walls 284A and 284B. The second end 254 of the leaf spring 242 can be contained within the spring guide space 286 between the guide walls 284A and 284B while being movable up and down along a travel distance $D_T$. Because the second end 254 is held between two guide walls 284A and 284B, a movement of the leaf spring 242 is limited along the width W1, thereby maintaining a movement of the leaf spring 242 along a width of the vehicle 100.

In some embodiments, the second spring bracket 248 further includes a lower spring retainer 288 configured to retain the second end 254 of the leaf spring 242 at the lower (free) end 290 of the spring guide portion 276 and define the travel distance $D_T$ of the second end 254 of the leaf spring 242 so that a longitudinal movement of the second end 254 of the leaf spring 242 is limited between the spring end rest portion 274 (as an upper limit) and the lower spring retainer 288 (as a lower limit). As illustrated, the lower spring retainer 288 can be configured as a pin that is inserted and supported through pin holes 292A and 292B formed in the guide walls 284A and 284B, respectively.

Referring still to FIGS. 3-5, the vehicle elevation system 102 includes an elevation device 300 configured to extend between the rear suspension system 202 and a part of the vehicle 100 and elevates the vehicle against the rear suspension system 202. For example, the elevation device 300 can be operated in a retracted position (FIG. 4) where the vehicle 100 is in the normal position, and an extended position (FIG. 5) where the vehicle 100 is in the elevated position.

The elevation device 300 includes an actuator coupled to the rear suspension system 202 at one end and to a part of the vehicle 100 at the other end and configured to raise the part of the vehicle 100 against the rear suspension system 202. Such an actuator for the elevation device 300 can be of various configurations, such as hydraulic actuators, pneumatic actuators, electric actuators, thermal or magnetic actuators (e.g., with shape memory alloys or magnetic shape memory alloys), and mechanical actuators (e.g., with a combination of mechanical components such as gears, rails, pulleys or chains).

In the illustrated example, the elevation device 300 is configured as a hydraulic cylinder assembly 302. As shown in FIGS. 4 and 5, the hydraulic cylinder assembly 302 includes a cylinder body 304 and a piston 306 (FIG. 7) with a piston rod 308. In some embodiments, the cylinder body 304 is mounted to the vehicle frame 114, and the piston rod 308 is connected to the second rear axle 224.

When the piston rod 308 is fully retracted into the cylinder body 304, the cylinder assembly 302 is in the retracted position (FIG. 4). As the piston rod 308 extends out from the cylinder body 304, the cylinder assembly 302 moves to the extended position (FIG. 5). In the extended position, the cylinder body 304 supports the vehicle frame 114 upwards while the piston rod 308 pushes down on the second rear axle 224.

In some embodiments, the cylinder body 304 is pivotally mounted to the vehicle frame 114 with or without a cylinder bracket 310. In the illustrated example, the cylinder bracket 310 is provided to pivotally connect the cylinder body 304 at a pivot point 311. The cylinder bracket 310 can be mounted to the vehicle frame 114.

An example of the cylinder bracket 310 is illustrated in FIGS. 7A-7C. In this example, the cylinder bracket 310 includes a bracket base 312 configured to be mounted to the vehicle frame 114 through fastening holes 314. The cylinder bracket 310 further includes a cylinder connection portion 316 to which the cylinder body 304 is coupled. In some embodiments, the cylinder connection portion 316 provides one or more connection holes 318 for rotatably connecting a head of the cylinder body 304 using for example a fastener engaging though the holes 318 and a corresponding hole at the head of the cylinder body 304. In this configuration, the connection holes 318 is in line with the pivot point 311 around which the cylinder body 304 pivots as the cylinder assembly 302 operates between the retracted position and the extended position. In some embodiments, the cylinder bracket 310 further includes opposite walls 320 extending from the base 312 and configured to limit a lateral movement of the cylinder body 304 between the opposite walls 320.

Referring back to FIGS. 3-5, in some embodiments, the piston rod 308 is pivotally connected to the second rear axle 224. Such a pivotal connection between the piston rod 308 and the second rear axle 224 can be made in various configurations. In the illustrated example, a piston rod bracket 330 can be provided on the second rear axle 224 to pivotally couple an end of the piston rod 308. The piston rod bracket 330 can include one or more pivot holes for rotatably coupling the end of the piston rod 308 using, for example, a fastener engaging through the pivot holes of the piston rod bracket 330 and a corresponding hole at the end of the piston rod 308.

Other configurations are also possible to enable the end of the piston rod 308 to be pivotally engaged with the second rear axle 224. For example, the end of the piston rod 308 can have a curved portion that corresponds with a curvature of the second rear axle 224, so that the curved portion of the piston rod 308 can seat at least partially around the second rear axle 224. With this configuration, the end of the piston rod 308 can be pivotally engaged with the second rear axle 224 without mechanical fixing or fastening.

In this example, it is primarily described that the elevation device 300 is associated with the second rear axle assembly 222 of the rear suspension system 202. However, it is understood that, alternatively or in addition, the elevation device 300 is associated with the first rear axle assembly 220 of the rear suspension system 202 and/or the front suspension system 204 of the vehicle 100.

Figure 8:
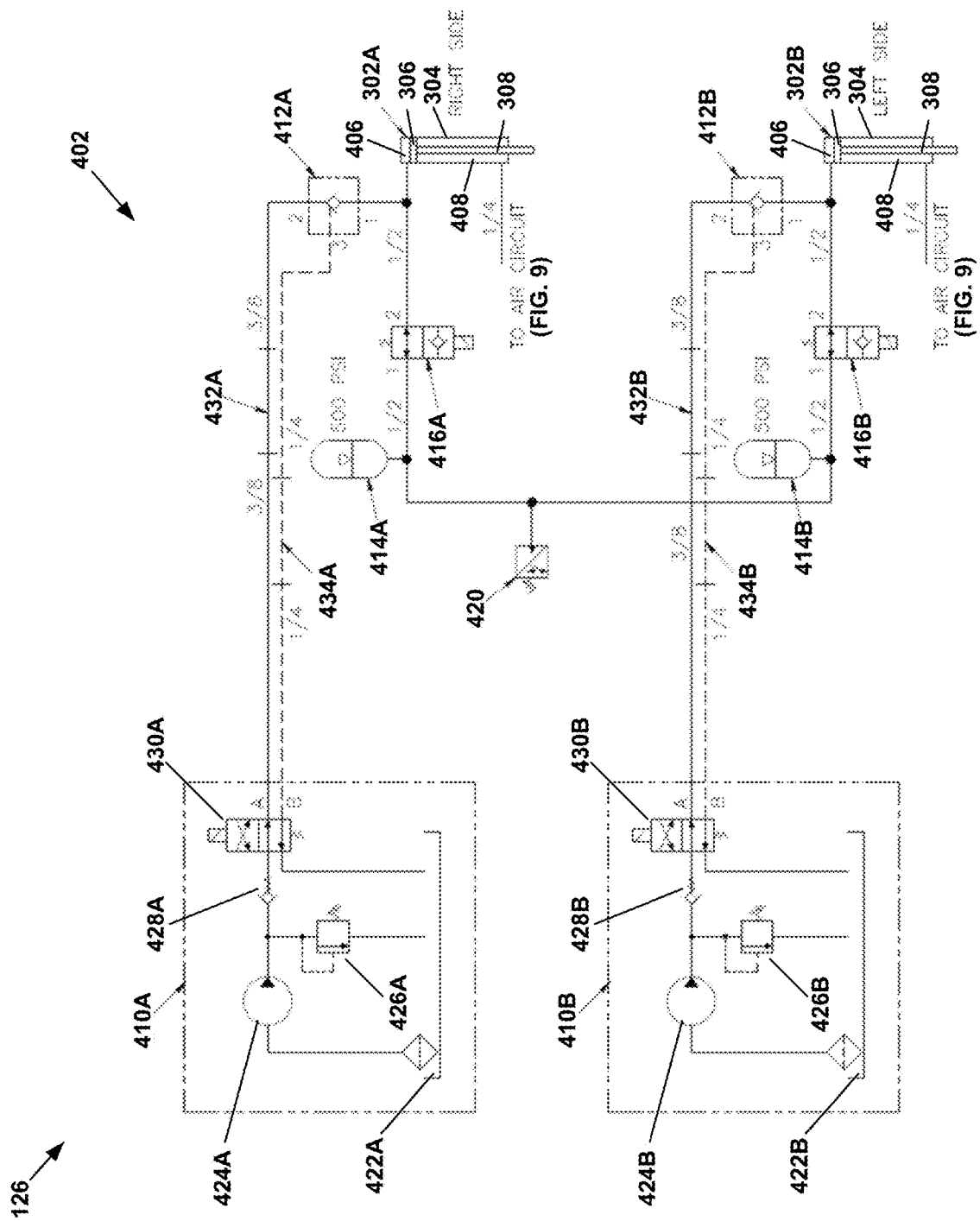
FIG. 8 is an example diagram of a hydraulic circuit for controlling an elevation control device.
Figure 9:
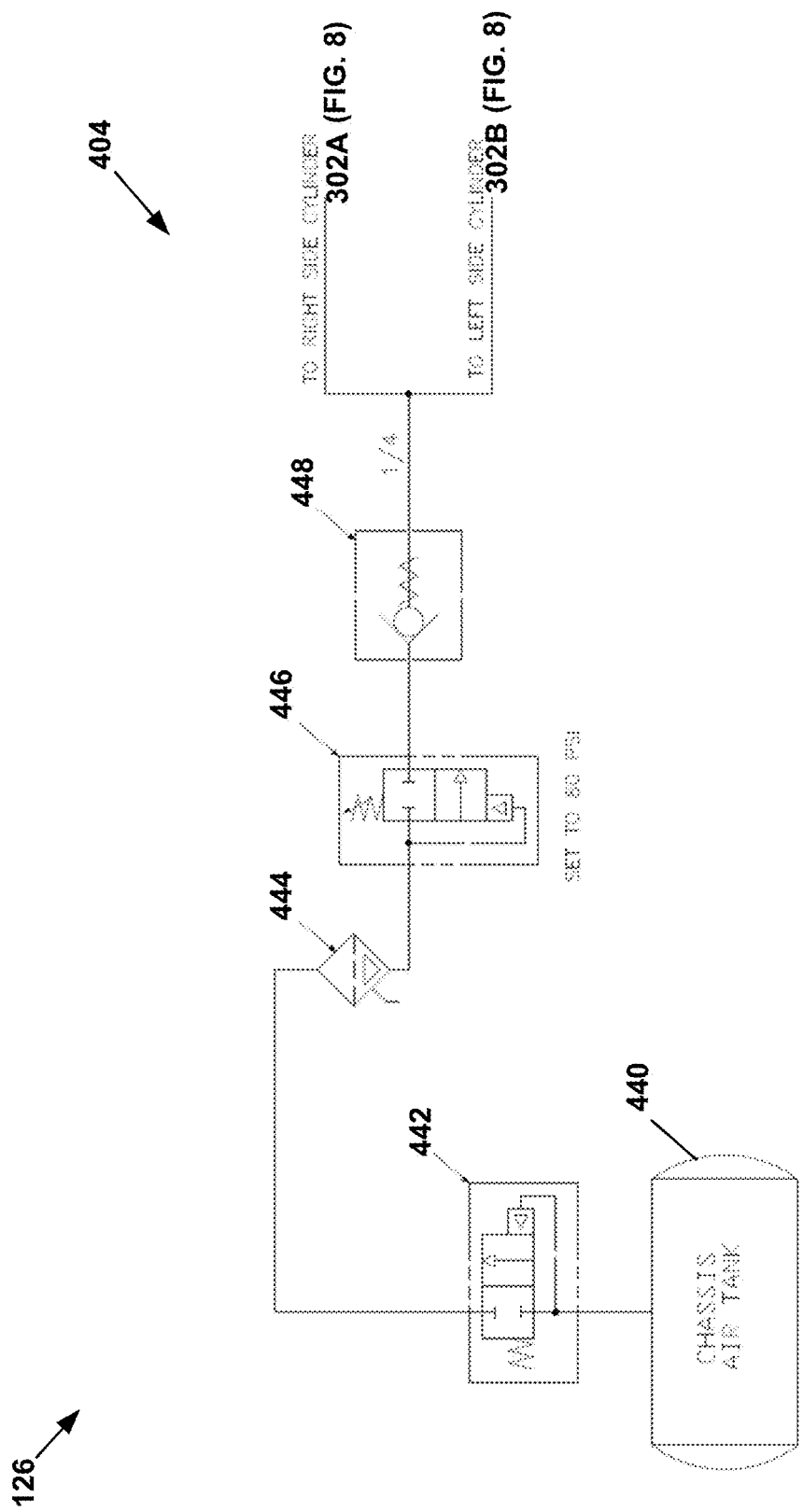
FIG. 9 is an example diagram of an air supply circuit for controlling the elevation control device.

Referring to FIGS. 8 and 9, an example of the elevation control device 126 is further described. As described herein, the elevation control device 126 can be part of the vehicle elevation system 102 and operate to control the elevation device 300. In particular, FIG. 8 is an example diagram of a hydraulic circuit 402 for controlling the elevation control device 126, and FIG. 9 is an example diagram of an air supply circuit 404 for controlling the elevation control device 126.

In the illustrated example, the elevation control device 126 is configured to control two hydraulic cylinder assemblies 302 (including 302A and 302) as the elevation device 300. A first hydraulic cylinder assembly 302A is arranged on one side (e.g., right side) of the vehicle 100 and a second hydraulic cylinder assembly 302B is arranged on the other side (e.g., left side) of the vehicle 100. As illustrated in FIG. 3, the first hydraulic cylinder assembly 302A is associated with a portion of the second rear axle 224 adjacent the second rear wheel 226 at the right side of the vehicle, and the second hydraulic cylinder assembly 302B is associated with a portion of the second rear axle 224 adjacent the second rear wheel 226 at the left side of the vehicle.

The first hydraulic cylinder assembly 302A and the second hydraulic cylinder assembly 302B are similarly controlled in the elevation control device 126. Therefore, the elevation control device 126 is described herein primarily with respect to the first hydraulic cylinder assembly 302A, and the same principles are applied to the second hydraulic cylinder assembly 302B.

As illustrated in FIG. 8, each of the hydraulic cylinder assemblies 302A and 302B has a hydraulic chamber 406 and an air chamber 408. The hydraulic chamber 406 is defined by the cylinder body 304 and the piston 306, and the air chamber 408 is defined at the other side of the hydraulic chamber 406 by the cylinder body 304 and the piston 306. In this example, the piston rod 308 extends through the air chamber 408. The hydraulic chamber 406 is connected to the hydraulic circuit 402, and the air chamber 408 is connected to the air supply circuit 404.

Referring still to FIG. 8, the hydraulic circuit 402 includes a first hydraulic power supply 410A, a first safety valve 412A, a first hydraulic accumulator 414A, a first control valve 416A, and a switch 420, in order to control the first hydraulic cylinder assembly 302A. In some embodiments, the hydraulic circuit 402 is manually controlled through a user interface (e.g., switches, buttons, etc.), which may be provided in various locations, such as in the cab 112 of the vehicle 100.

The first hydraulic power supply 410A operates to supply fluid to the hydraulic chamber 406 of the first hydraulic cylinder assembly 302A. In some embodiments, the first hydraulic power supply 410A is powered by an electric power source of the vehicle, such as one or more batteries in the vehicle. In some embodiments, the first hydraulic power supply 410A includes a reservoir 422A, a pump 424A, a relief valve 426A, a check valve 428A, and a directional control valve 430A.

The first safety valve 412A is used to ensure that the first hydraulic cylinder assembly 302A remains operable by the first hydraulic power supply even if the first hydraulic power supply 410A fails or if a hose 432A connecting the first hydraulic power supply 410A and the first hydraulic cylinder assembly 302A is damaged. In some examples, the first safety valve 412 is configured as a pilot check valve. As illustrated, the first safety valve 412A has an alternative line 434A from the first hydraulic power supply 410A for emergency operations.

The first hydraulic accumulator 414A is used to operate as a spring assembly for the vehicle when the vehicle is driven on the road. The first hydraulic accumulator 414A can function as a pressure storage reservoir in which a noncompressible hydraulic fluid is held under pressure that is applied by an external source, such as a spring, a raised weight, or a compressed gas.

The first control valve 416A operates to selectively connect the first hydraulic accumulator 414A to the hydraulic chamber 406 of the first hydraulic cylinder assembly 302A. In some embodiments, the first control valve 416A operates to disconnect the first hydraulic accumulator 414A from the first hydraulic cylinder assembly 302A as the vehicle 100 moves from the normal position to the elevated position. This disconnection prevents the first hydraulic accumulator 414A from allowing the vehicle 100 to pivot or wobble from side to side as the vehicle 100 is lifted to the elevated position and the debris body of the vehicle 100 is tilted for dumping into a disposal container.

The switch 420 operates to detect whether the first control valve 416A has disconnected the first hydraulic accumulator 414A from the first hydraulic cylinder assembly 302A when the vehicle 100 is elevated. As discussed above, the first hydraulic accumulator 414A is designed to be disconnected from the first hydraulic cylinder assembly 302A as the vehicle is elevated, thereby stabilizing the vehicle during the elevation of the vehicle. Thus, the switch 420 is configured to detect whether the first hydraulic accumulator 414A remains connected to the first hydraulic cylinder assembly 302A even after the vehicle begins being elevated. In some embodiments, the switch 420 includes a pressure sensor that monitors a pressure in the line from the hydraulic chamber 406 of the first hydraulic cylinder assembly 302A. When an undesired pressure is detected, the switch 420 can generate a notification to alarm an operator so that the operator stops operating the elevation of the vehicle and controls the first control valve 416A to disconnect the first hydraulic accumulator 414A from the first hydraulic cylinder assembly 302A before resuming the elevation of the vehicle. In other embodiments, the first control valve 416A can be automatically controlled to selectively connect or disconnect the first hydraulic accumulator 414A to/from the first hydraulic cylinder assembly 302A.

Similarly, the hydraulic circuit 402 further includes a second hydraulic power supply 410B, a second safety valve 412B, a second hydraulic accumulator 414B, a second control valve 416B, and the switch 420, in order to control the second hydraulic cylinder assembly 302B. In this example, the configurations and operations of these elements are identical, and thus the description of these elements is not repeated for brevity purposes.

In some embodiments, the first hydraulic cylinder assembly 302A and the second hydraulic cylinder assembly 302B are simultaneously controlled to maintain a balance of the vehicle while being elevated or during dumping. Where the first hydraulic power supply 410A and the second hydraulic power supply 410B are configured to be operated through two independent user interfaces (e.g., buttons or switches), an operator can simultaneously operate the user interfaces to run the first hydraulic cylinder assembly 302A and the second hydraulic cylinder assembly 302B together.

In some embodiments, the vehicle 100 is provided with a sensor that detects an inclination of the vehicle 100 across its width (i.e., between the left and right sides of the vehicle). One example of the sensor includes an inclinometer. The sensor is used to determine whether the vehicle maintains to be leveled as the vehicle is lifted from the normal position to the elevated position. If the vehicle is detected to be horizontally uneven (and thus unbalanced), an operator can manually control the elevation control device 126 to adjust either the first hydraulic cylinder assembly 302A or the second hydraulic cylinder assembly 302B, thereby making the vehicle stay leveled during elevation of the vehicle or dumping the debris body of the vehicle. For example, if an unbalance at the rear of the vehicle (where the vehicle is elevated) is determined and presented to an operator through a display device, the operator can independently adjust the level by running either the first hydraulic cylinder assembly 302A or the second hydraulic cylinder assembly 302B and thus extending the first hydraulic cylinder assembly 302A and the second hydraulic cylinder assembly 302B in different amounts. In other embodiments, the elevation control device 126 can automatically adjust the operations of the first hydraulic cylinder assembly 302A and the second hydraulic cylinder assembly 302B to make the vehicle remain balanced.

As illustrated in FIG. 9, the air supply circuit 404 includes an air tank 440, a pressure protection valve 442, an air dryer 444, a pressure regulator 446, and a check valve 448. In some embodiments, where the vehicle 100 includes an air supply for an air brake system, the air tank 440 can be the same air supply for the air brake system. The pressure protection valve 442 operates as a safety device to shut the air from the air tank 440 if air leakage occurs. The air dryer 444 operates to filter and dry the air from the air tank 440. The pressure regulator 446 is configured to regular the pressure of air from the air tank 440. In some embodiments, the pressure regulator 446 operates to set the air pressure to 80 psi.

As such, the air supply circuit 404 operates to provide air to the air chambers 408 of the first hydraulic cylinder assembly 302A and the second hydraulic cylinder assembly 302B and maintain the air pressure therein. The air pressure in the air chambers 408 of the first hydraulic cylinder assembly 302A and the second hydraulic cylinder assembly 302B functions to continuously hold the cylinder assemblies 302A and 302B with respect to the second rear axle 224, thereby providing clearance between the cylinder assemblies 302A and 302B and the second rear axle 224 and preventing damage to the components of the vehicle 100.

Figure 10:
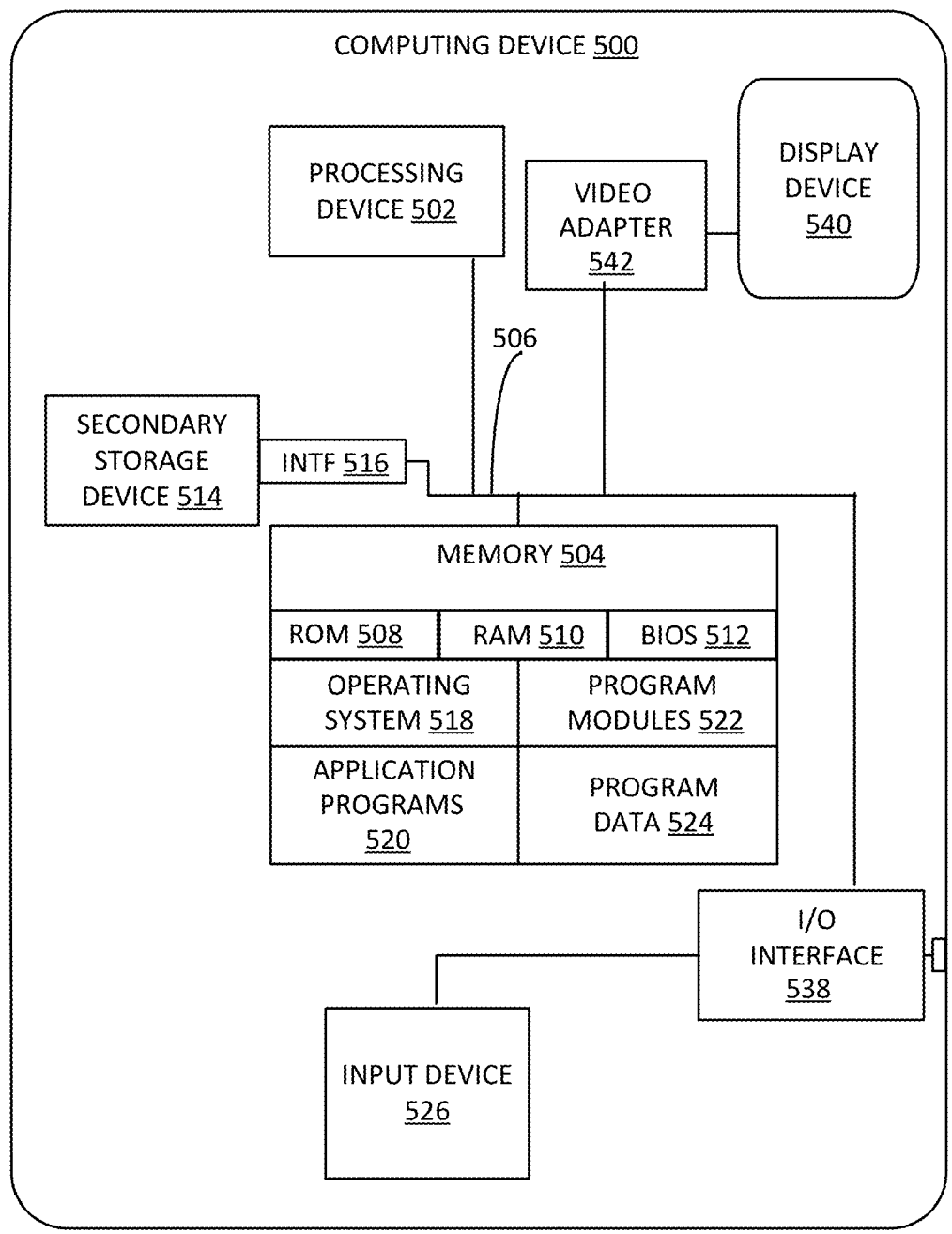
FIG. 10 illustrates an exemplary architecture of a computing device which can be used to implement aspects of the present disclosure.

FIG. 10 illustrates an exemplary architecture of a computing device 500 which can be used to implement aspects of the present disclosure, including the control device 122, and will be referred to herein as the computing device 500. The computing device 500 is used to execute the operating system, application programs, and software modules (including the software engines) described herein. The control device 122 can include all or some of the elements described with reference to FIG. 10, with or without additional elements. In some embodiments, the computing device 500 can be used to automate at least some of the lifting operations as described and illustrated herein.

The computing device 500 includes, in some embodiments, at least one processing device 502, such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures.

The system memory 504 includes read only memory 508 and random access memory 510. A basic input/output system 512 containing the basic routines that act to transfer information within the computing device 500, such as during start up, is typically stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the computing device 500.

A number of program modules can be stored in secondary storage device 514 or memory 504, including an operating system 518, one or more application programs 520, other program modules 522, and program data 524.

In some embodiments, the computing device 500 includes one or more input devices 526 to enable a user to provide inputs to the computing device 500. Examples of input devices 526 include the control panel 124 as described herein.

In this example embodiment, a display device 540 is also connected to the system bus 506 via an interface, such as a video adapter 542. The display device 540 can be an example of the output device 128 as described herein.

In addition to the display device 540, the computing device 500 can include various other peripheral devices (not shown), such as speakers.

The computing device 500 typically includes at least some form of computer-readable media. Computer readable media includes any available media that can be accessed by the computing device 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

As described herein, the vehicle elevation system of the present disclosure provides a safe and durable structure for elevating a vehicle body. Further, the vehicle elevation system is convenient to control while the vehicle is movable. While the rear side of the vehicle is lifted, the rear tires of the vehicle continue to bear on the ground, in contrast to typical vehicle elevation mechanisms, such as outriggers. The vehicle elevation system is fully incorporated in the vehicle and does not require additional components to elevate the vehicle.

As illustrated herein, the vehicle is driven back up toward a disposal container and at the same time the vehicle can be elevated at the rear end. An operator does not need to drive the vehicle near the container and stop the vehicle before operating to lift the rear of the vehicle for dumping. Once the vehicle is arranged properly with respect to the container and elevated at the rear, the operator can set the parking brake and get out from the cab and operate the dumping mode, in which the debris body (or the bed thereof) is tilted and the cover of the debris body is open. In some embodiments, a bumper is provided and configured to touch the container as the vehicle is lifted and backed up toward the container.

As described herein, when the frame is elevated against the axle, the spring assembly is operatively disengaged from other components and thus provides no suspension effect to the vehicle. Such disengagement of the spring assembly improves stability when the vehicle is in the elevation operation or dumping operation.

The suspension system of the present disclosure is not limited to the illustrated example in this document, and various types of suspensions can be used for the suspension system of the present disclosure. By way of examples, various types of air suspensions, rubber load suspensions, spring suspensions, solid mount suspensions, rubber walking beam suspensions, and other available vehicle suspensions.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A vehicle comprising:
    a suspension system;
    an elevation device arranged between the suspension system and a part of the vehicle; and
    an elevation control device configured to operate the elevation device between a retracted position and an extended position, wherein the elevation device extends between the suspension system and the part of the vehicle and elevates the vehicle against the suspension system, and wherein when the elevation device is in the extended position at least a portion of the suspension system operatively disengages from the part of the vehicle.

2. The vehicle of claim 1, wherein the part of the vehicle includes a vehicle frame, wherein the elevation device extends between the suspension system and the vehicle frame.

3. The vehicle of claim 2, wherein the suspension system includes an axle assembly including wheels and an axle.

4. The vehicle of claim 3, wherein the elevation device extends between the axle and the vehicle frame.

5. The vehicle of claim 3, wherein, in the extended position, tires of the wheels remain in contact with the ground and rotatable so that the vehicle is drivable.

6. The vehicle of claim 1, wherein the elevation device includes a hydraulic cylinder assembly having a hydraulic chamber, and the elevation control device includes a hydraulic circuit, the hydraulic circuit being in fluid communication with the hydraulic chamber.

7. The vehicle of claim 6, wherein the hydraulic circuit includes:
a hydraulic power supply configured to supply fluid to the hydraulic chamber;
a hydraulic accumulator being selectively in fluid communication with the hydraulic chamber; and
a control valve configured to selectively connect the hydraulic accumulator to the hydraulic chamber, the control valve configured to disconnect the hydraulic accumulator from the hydraulic chamber as the elevation device operates from the retracted position to the extended position.

8. The vehicle of claim 3, wherein the suspension system includes a spring assembly connected between the axle assembly and the vehicle frame.

9. The vehicle of claim 8, wherein the spring assembly is configured to move relative to the vehicle frame as the elevation device moves between the retracted position and the extended position.

10. The vehicle of claim 6, wherein the hydraulic cylinder assembly further includes an air chamber opposite to the hydraulic chamber, and the elevation control device includes an air supply circuit being in fluid communication with the air chamber.

11. A dumping vehicle comprising:
a vehicle frame;
a debris body;
a front suspension system;
a rear suspension system including a first rear axle assembly;
an elevation device arranged between the rear suspension system and the vehicle frame; and
an elevation control device configured to operate the elevation device between a retracted position and an extended position, wherein the elevation device extends between the rear suspension system and the vehicle frame and elevates the vehicle frame against the rear suspension system, and wherein when the elevation device is in the extended position at least a portion of the suspension system operatively disengages from the vehicle frame.

12. The dumping vehicle of claim 11, wherein, when the elevation device is in the extended position, the front suspension system and the rear suspension system remain in contact with the ground so that the dumping vehicle is drivable.

13. The dumping vehicle of claim 11, wherein the rear suspension system further includes:
a second rear axle assembly; and
a spring assembly including a leaf spring, a first spring bracket, and a second spring bracket,
wherein the elevation device is engaged between the second rear axle assembly and the vehicle frame.

14. The dumping vehicle of claim 13, wherein the first spring bracket is configured to engage a first end of the leaf spring and mounted to the vehicle frame adjacent the first rear axle assembly, and
wherein the second spring bracket is configured to engage a second end of the leaf spring and mounted to the vehicle frame adjacent the second rear axle assembly.

15. The dumping vehicle of claim 14, wherein the second spring bracket includes a spring end rest portion configured to provide a surface against which the second end of the leaf spring rests when the elevation device is in the retracted position.

16. The dumping vehicle of claim 15, wherein the second spring bracket further includes a spring guide portion configured to movably engage the second end of the leaf spring as the elevation device moves between the retracted position and the extended position.

17. The dumping vehicle of claim 13, wherein the elevation device includes a hydraulic cylinder assembly having a hydraulic chamber, and the elevation control device includes a hydraulic circuit, the hydraulic circuit being in fluid communication with the hydraulic chamber.

18. The dumping vehicle of claim 17, wherein the hydraulic circuit includes:
a hydraulic power supply configured to supply fluid to the hydraulic chamber;
a hydraulic accumulator being selectively in fluid communication with the hydraulic chamber; and
a control valve configured to selectively connect the hydraulic accumulator to the hydraulic chamber, the control valve configured to disconnect the hydraulic accumulator from the hydraulic chamber as the elevation device operates from the retracted position to the extended position.

19. The dumping vehicle of claim 18, wherein the hydraulic circuit further includes:
a safety valve arranged between the hydraulic power supply and the hydraulic chamber of the hydraulic cylinder and configured to ensure that the hydraulic cylinder assembly remains operable by the hydraulic power supply.

20. The vehicle of claim 17, wherein the hydraulic cylinder assembly further includes an air chamber opposite to the hydraulic chamber, and the elevation control device includes an air supply circuit being in fluid communication with the air chamber.

21. A vehicle comprising:
a suspension system;
an elevation device arranged between the suspension system and a part of the vehicle; and
an elevation control device configured to operate the elevation device between a retracted position and an extended position, wherein the elevation device extends between the suspension system and the part of the vehicle and elevates the vehicle against the suspension system,
wherein the elevation device includes a hydraulic cylinder assembly having a hydraulic chamber, and the elevation control device includes a hydraulic circuit, the hydraulic circuit being in fluid communication with the hydraulic chamber, and wherein the hydraulic cylinder assembly further includes an air chamber opposite to the hydraulic chamber, and the elevation control device includes an air supply circuit being in fluid communication with the air chamber.

22. A dumping vehicle comprising:
a vehicle frame;
a debris body;
a front suspension system;
a rear suspension system including:
a first rear axle assembly;
a second rear axle assembly; and
a spring assembly including a leaf spring, a first spring bracket, and a second spring bracket, wherein the first spring bracket is configured to engage a first end of the leaf spring and mounted to the vehicle frame adjacent the first rear axle assembly, and wherein the second spring bracket is configured to engage a second end of the leaf spring and mounted to the vehicle frame adjacent the second rear axle assembly;

an elevation device arranged between the rear suspension system and the vehicle frame, wherein the elevation device is engaged between the second rear axle assembly and the vehicle frame; and an elevation control device configured to operate the elevation device between a retracted position and an extended position, wherein the elevation device extends between the rear suspension system and the vehicle frame and elevates the vehicle frame against the rear suspension system.

* * * * *